UNITED STATES PATENT OFFICE 2,403,962

METHOD FOR TREATING STYRENE

Làszló Aüer, South Orange, N. J.

No Drawing. Application October 12, 1942,
Serial No. 461,798

7 Claims. (Cl. 260—91)

GENERAL FIELD OF INVENTION AND STATEMENT OF OBJECTS

This invention relates to treatment of styrene, and is particularly concerned with modifying the characteristics and properties of styrene by the employment of modifying agents. The present application is a continuation-in-part of my copending application 318,650, filed February 12, 1940, now Patent 2,298,270, issued Oct. 13, 1942.

As is known, styrene is vinyl benzene

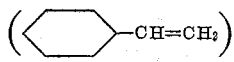

having a boiling point at 145° C. to 146° C. It is a natural ingredient of storax (a kind of balsam), and is made synthetically, either by slow distillation of cinnamic acid, or by passing a mixture of benzene vapor and ethylene through a red hot tube. This material, boiling at about 145° C., has come to be known as "monomeric" styrene.

Monomeric styrene has many industrial applications, such, for instance, as for making resins, and for making thermo-plastic and also infusible polymers. The products resulting from heat treatment of monomeric styrene are useful in many different physical forms, for instance, in liquid form, or in paste-like or rubber-like forms, or in the form of tough solids, and also in the form of friable glass-like materials.

Broadly stated, the present invention has reference to the modification of the characteristics and properties of monomeric styrene (vinyl benzene), so as to better fit the heat-treated material for various of the foregoing and other industrial purposes and applications. Briefly stated, the process of the invention involves heating the styrene with certain modifying agents, and notably with polar compounds of quite a wide variety of different types, capable of influencing the properties of styrene, and thereby enabling the production of modified styrene products having many different and new chemical and/or physical characteristics.

It has long been known that mere heating of styrene will change the physical consistency thereof. The present invention, however, contemplates further changes in properties, i. e., changes in addition to those brought about by mere heating. Thus, for example, the invention contemplates employment of certain modifying agents capable of altering, for instance, accelerating or retarding, the effect which a particular heat treatment would otherwise produce. Moreover, employment of various of the modifying agents introduces other changes in the properties which do not occur by heating alone.

In referring to changes of the foregoing type (and others) and in making comparisons of the modified and heat treated styrene products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

As is mentioned in my copending application above referred to, and also in others referred to hereinafter, I believe styrene to be an organic isocolloid, i. e., a colloidal system in which the dispersed phase and the dispersion medium are both of the same chemical composition though present in different physical states.

By the modification process of the present invention, I believe the relative proportions of dispersed phase and dispersion medium are altered, thereby altering the properties, and notably the physical consistency of the product. In fact, I consider styrene as being one of the best examples of organic isocolloids in which the relation of the dispersed phase and dispersion medium may be altered by treatment in various ways. The modifications in physical consistency which may be brought about by the employment of various of the polar compounds contemplated for use as modifying agents is, in many cases, extremely pronounced, so that even when employing relatively low viscosity styrene as starting material, it is possible, by employment of certain modifying agents, to bring about an extremely rapid and also extremely extensive degree of solidification (when at room temperature). In fact, it is possible by this change in relation between the dispersed phase and dispersion medium and/or by aggregation to readily produce a product almost of glass-like consistency.

On the other hand, by appropriate selection of certain other modifying agents, it is also possible to retard the tendency to solidify which accompanies heating at certain temperatures, and in fact, even to produce products of liquid consistency (when at room temperature), though such products may be altered with respect to other properties. This type of modification may for convenience be considered as "liquefaction," in contrast to the modification brought about by other agents tending to promote solidification.

I believe also that by the process of the present invention, the size of the micelles of the dispersed phase may also be changed.

The Modifying Agent

As is mentioned in my copending application above identified, I believe that the colloidal system of organic isocolloids may be modified by means of modifying agents. According to the invention, such modifying agents are polar compounds in general. By polar compounds I mean compounds having polarity in the molecule, thus including electrolytes. Examples are given below.

Polar compounds are of many different classes, many of which are defined in my copending application above mentioned (and also in others referred to hereinafter). The type of modification secured by various groups of modifying agents and even by individual agents, may be quite different, many agents and groups producing results which are quite distinctive, although as before mentioned, I believe the polar compounds are capable of influencing the colloidal system of the styrene, in various of the respects already mentioned, and possibly also in other respects.

As a broad general classification, the polar compounds may be divided into two groups, one of which tends to promote solidification of the styrene, and the other of which tends to retard solidifying which would normally occur by certain types of treatment (for instance, heating under given conditions). It is here again mentioned that these comparisons are based on the relation to a treatment of styrene under the same conditions but without employing the modifying agent.

The first classification of modifying agents is particularly useful in instances where it is desired to secure hard products, such as glass-like products. There are, of course, many other uses where it is desirable to employ agents tending to promote solidification.

On the other hand, the second classification is of especial importance for certain other purposes, particularly where toughness in the product is desired, as for example, in molding powders for injection molding purposes. This second classification is also of importance where the styrene product is to be employed in coating compositions and the like and in instances where "co-polymerization" or "co-aggregation" is desired between the styrene and other unsaturated organic isocolloids, and also where large batches are to be treated, in which event retarding the rate of solidification aids in securing uniformity of treatment through the mass of the batch.

At least many of the metal salts are polar compounds belonging to the first classification. Acid salts, and especially materials containing or developing $SO_2$, usually display a strong solidifying action. Many metal halides, (halogen salts) also promote solidification. As an example of one specific material, it may be mentioned that sodium bisulphite extensively promotes solidification.

In the second classification are at least many of the organic sulpho- and halo-compounds, and of the organic amines. A specific example of this group is benzidine base.

More particularly, the modifying agents include organic and inorganic acids, the salts of such acids, and metallic derivatives of organic compounds (organic metal compounds) separately or mixed.

Acidic polar compounds, either organic or inorganic compounds, are effective groups of modifying agents.

Compounds containing the following cations or anions, or both, are advantageous:

As cations:
Ammonium
Sodium
Potassium
Lithium
Strontium
Calcium
Barium
Magnesium
Iron (ferric and ferrous)
Cobalt
Aluminum
Lead
Antimony
Manganese
Tin (stannic and stannous)
Cadmium
Bismuth
Zinc
Organic ammonium ions, etc.

As anions:
Naphthalene sulphonic (acid)
Carbonic (acid)
Tartaric (acid)
Oxalic (acid)
Acetic (acid)
Formic (acid)
Citric (acid)
Hydrochloric (acid)
Hydrobromic (acid)
Hydriodic (acid)
Sulphuric (acid)
Sulphurous (acid)
Hydrosulphurous (acid)
Hydrosulphuric (acid)
Thiosulphuric (acid)
Nitric (acid)
Nitrous (acid)
Boric (acid)
Phosphoric (acid)
Hydrocyanic (acid)
Thiocyanic (acid)
Maleic (acid)
Salicylic (acid)
Phthalic (acid)
Sulphanilic (acid)
Naphthenic (acid)

The organic acids may be either aromatic or aliphatic, monobasic or polybasic, especially dibasic.

Neutral salts may also be used, and in addition the modifying agents may be salts of organic bases, organic bases, and metallic derivatives of organic compounds in general.

Certain of the compounds comprise within the molecule an acidic inorganic residue and an organic residue. (By an acidic inorganic residue I means such an inorganic residue as can be converted by the addition of one or more hydrogen atoms, or water molecules, or merely by the application of heat, into an inorganic acid, including carbonic acid as inorganic.) This group of polar compounds may be represented by the following generic formula $R—X_n$ wherein R represents the inorganic acidic residue, and X represents the inorganic acidic residue, the $n$ being 1–5. The acidic inorganic groups may be nitro, halogen, sulphur-containing radicles, carboxyl, etc., and one or more such groups may be present in the molecule and attached to the organic residue.

Organic halogen compounds constitute an advantageous class, both aromatic and aliphatic, containing chlorine, iodine, bromine, etc., the following being typical and illustrative of this class:

o-Dichlorobenzene
p-Dichlorobenzene
Trichlorobenzene
Naphthalene tetrachloride
Naphthalene trichloride
Naphthalene hexachloride
Naphthalene monochloride
Nitro-chlorobenzenes, ortho, meta and para
Nitro-dichlorobenzenes
Chloro-dinitrobenzenes
Monochlorobenzene
Chlorinated diphenyl
Pinene hydrochloride
4-chloro-o-anisidine
p-Nitro-chloro-benzene
Triphenyl-chloro-methane
Benzyl chloride
Benzoyl chloride
Acetyl chloride
Acetyl bromide
Phthaloyl chloride
Trichloroacetic acid
Monochloroacetic acid
Chloral hydrate
Iodoform The halogen compounds listed ante and other halogenated aryl and aliphatic compounds, including acyl chlorides, chloro-acids, hydrochloride salts, etc. may be used in the practice of the present invention. From the list given it will be seen that such halogenated compounds may also contain other substituents in addition to the halogen, such as hydroxy, amino, nitro, alkyl, aryl and other groups. Accordingly, such polar compounds may also be classified in the other groupings of these modifying agents.

In fact, nitro compounds per se are useful and advantageous in the practice of the present invention. And nitro organic compounds are another advantageous class of organic polar compounds. The following nitro compounds are typical and illustrative of this class:

Nitrobenzene
o-Nitrophenol
p-Nitrophenol
Dinitrobenzene
Nitro-chloro-benzene
Dinitro-chlorobenzene
Dinitroaniline
p-Nitro-acetanilide
Nitrocresol carbonate
m-Nitroaniline hydrochloride
Ethyl thioether of 2-nitrobenzene
Ethyl thioether of 2:4 dinitrobenzene
Ethyl thioether of nitro-aminobenzene
2:4-dinitrobenzene
Nitro-aminobenzene These illustrate the various general types of nitro compounds which may be used in addition to the nitro compounds shown in the other classification of these polar compounds.

Another advantageous class of modifying agents or polar compounds are the aromatic sulphonic acids, together with their salts, esters and halides. Of these the sulphonic acids and the sulphonyl chlorides are particularly useful here.

These polar compounds may be represented by the following generic formula $R—SO_n—Y$, wherein R represents an aryl nucleus, Y represents hydrogen, chlorine or an alkyl group or a metal and $n$ is 0 to 4. Typical examples of such compounds are the following compounds:

Benzene sulphonic acid
p-Toluene sulphonic acid
2:5 dichlorobenzene sulphonic acid
m-Xylidine sulphonic acid
p-Toluidine-m-sulphonic acid
Naphthalene 2:6 sulphonic acid
Beta-naphthol 1:5 sulphonic acid
Beta-naphthol 3:6:8 sulphonic acid
Beta-naphthylamine 3:6:8 trisulphonic acid
2:1 naphthylamine sulphonic acid
2:6 naphthylamine sulphonic acid
2-phenylamine-8-naphthol-6-sulphonic acid
Methyl-p-toluene sulphonate
Ethyl chlorosulphonate
Benzene sulphonyl chloride
p-Toluene sulphonyl chloride
Naphthalene-1-sulphonyl chloride
Dimethyl sulphate
Diaminodihydroxy anthraquinone disulphonic acid Metal salts of such sulphonic acids, such as the sodium salts, are useful in the present invention.

A still further class of polar compounds are the organic esters of inorganic acids, both aryl and alkyl esters, for instance, the following:

Triphenyl phosphate
Tricresyl phosphate and other alkyl-phenyl phosphates
Nitrocresyl carbonate
Ethyl chlorosulphonate
Dimethyl sulphate In addition to these, other alkyl and aryl esters of inorganic acids such as borates, phosphates, phosphites, sulphides, sulphates, thiocyanates, etc., may be used; for instance, propyl, butyl, amyl and iso-alkyl esters. Likewise, esters of various aliphatic alcohols and phenols with organic acids may be used.

Still another class of modifying agents or polar compounds useful in this invention, are the inorganic salts of organic bases, of which the following compounds are illustrative:

Diphenylamine hydrochloride
Diphenylamine hydrobromide
m-Nitroaniline hydrochloride
Trichloroaniline hydrochloride
Diphenyl amine sulphate
Diaminodiphenyl sulphate
Aniline sulphate
Amino-azo-benzene sulphate
4:4′ diamino-diphenyl sulphide
Aniline hydrochloride Several of the above compounds in addition to being salts, also contain other groups which impart polarity to the compound, such as nitro, amino and halogen groups. Compounds containing such groups are useful per se, as stated ante.

As examples illustrative of organic salts of organic acids, there may be mentioned diphenylamine trichloroacetate and methyl p-toluene sulphonate. Other wholly organic salts may be used. For instance, the alkyl and aryl esters of the various organic acids mentioned ante, such as tartrates, oxalates, acetates, formates, thiocyanates, salicylates, etc., may be used in the present invention. These are illustrative of the esters of mono- and di-basic acids which may be employed.

Likewise, alkyl and phenyl esters of other aliphatic and aromatic carboxylic acids, both mono- and di-basic acids, such as phthalates, benzoates, acetates, abietates, oleates, laurates, palmitates, ricinoleates, etc., may be used. Both the mono- and di-esters of di-basic acids are useful here. Likewise mixed alkyl and aryl esters and alkylated phenyl esters can be employed in some cases. Typical examples are as follows:

Di-butl phthalate
Mono-butyl phthalate
Di-ethyl phthalate
Ethyl butyl phthalate
Di-phenyl phthalate
Ethyl-phenyl tartrate
Methyl abietate
Ethyl abietate
Di-ethyl succinate
Phenyl thiocyanate
Ethyl malonate
Diethylammonium diethyldithiocarbamate
Ethyl salicylate
Methyl salicylate
Ethyl ether of ethyl salicylate
Butyl ether of ethyl ricinoleate That is, ether-ester and acid esters may be also employed here. Further, thioethers such as diaminodiphenyl sulphide, may also be used; they being so to speak organic esters of organic mercaptans (R—S—H) which are more or less sulphur acids. Other useful organic sulphides are diphenyl sulphide, ethyl phenyl sulphide and the alkyl thioethers of nitrobenzenes, such as the ethyl thioether of 2-nitrobenzene or of 2:4 dinitrobenzene. That is, the phenyl group of such sulphides or thioethers may be further substituted with groups such as amino, nitro, etc.; these groups increasing the polarity of the molecule.

Many of the polar compounds illustrated ante in the various classifications also contain amine or amino groups. Amines having a relatively high molecular weight are advantageous.

In the present invention, compounds containing primary, secondary or tertiary amine groups and containing one or more of such amine groups may be used as the modifying agent; those containing two such groups being advantageous.

One of the advantages of the amines as modifying agents is that they are relatively easier to dissolve or disperse in some organic isocolloids in order to modify them.

The amines may be used by themselves or in conjunction with other modifying agents. For instance, the amines may be used in conjunction with polar compounds comprising within the molecule an acidic inorganic residue and an organic residue such as given ante. Again, it is sometimes advantageous to use as the modifying agent, an organic polar compound containing both an amine group and an acidic residue, such as the aromatic amino sulphonic acids and other compounds of that type shown ante.

In addition to the amines, I may also use other organic bases as modifying agents in the present processes, for instance, napthols, phenols, etc. A wide range of organic bases may be used, according to the type of modified product desired.

The direct use of organic bases, such as arylhydroxy compounds, as the modifying agent, may be of advantage. However, in most embodiments of the present invention, such organic bases are used in conjunction with other modifying agents, they being employed to give an additional modification in the properties of the products obtained. The organic bases may be used here in conjunction with metal salts, acids, acid chlorides (acyl chlorides), etc. As stated ante, such polar compounds are advantageous modifying agents when used alone.

In fact, the acids are an important class of polar compounds and may be used alone as the modifying agent in the practice of the present invention. Certain of the advantageous acids, particularly the organic acids, have been described ante, although the inorganic acids are also useful.

In connection with the salts and esters, I mention many acids and these are suitable for use here in the form of the free acid as well as in the form of metal salts and esters. As mentioned ante, acid salts and acid esters may be used and these so to speak are partly neutralized acids; that is, they are of acid character. Also the anhydrides and acid chlorides of these acids are useful here as the modifying agent. As shown ante, the metal salts of these acids may be used as the polar compound, here.

Examples of metal salts, both neutral and acid salts, which are advantageous in the practice of the present invention are as follows:

Ammonium iodide
Cadmium iodide
Zinc bromide
Barium thiocyanate
Potassium thiocyanate
Ammonium chloride
Magnesium chloride
Magnesium sulphate
Sodium sulphate
Sodium hydrogen sulphate
Di-sodium hydrogen phosphate
Sodium bisulphite
Sodium sulphite
Lithium sulphite
Lithium carbonate
Zinc carbonate
Sodium sulphide
Barium sulphide
Lead chromate
Potassium dichromate
Cadmium sulphide
Sodium bicarbonate
Tin carbonate
Tin sulphite
Tin sulphide
Tin chloride (stannous and stannic)
Antimony sulphide
Zinc sulphide
Barium sulphide
Barium carbonate
Calcium sulphite
Strontium sulphite
Magnesium sulphite
Barium sulphite
Lead sulphite
Cadmium sulphite
Mercuric sulphate It will be noted that, almost without exception, the polar compounds listed or described herein are distinguished by the presence in the molecule of two or more dissimilar atoms, at least one of which atoms is a non-metal—the non-metals being defined as "elements whose oxides react with water to form acids." (See, for instance, Holmes, General Chemistry, 1923 Edition, pages 19 and 67.) Of this general class, nitrogen, sulfur and the halogens are outstanding exponents.

TREATMENT CONDITIONS

Various of the treatment conditions will, of course, be different, depending upon the modifying agent selected and the character of the product desired.

One of the most important considerations here to be noted is that thorough dispersion of the modifying agent in the colloidal system of the styrene is of importance. The modifying agents may be ground or milled, for instance, on a paint mill or the like, together with at least a portion of the styrene as an aid in securing dispersion. Moreover, agitation may be employed to this same end.

Customarily, however, application of heat is of importance in securing thorough dispersion and effective modification of the styrene. The temperature of heating is desirably above room temperature but should not be above the distillation point (boiling point) or decomposition point. This, in fact, is in general of treatment of iso-colloids as is mentioned in my copending applications elsewhere referred to herein.

Since the boiling point of styrene is about 146° C., the treatment temperature should not exceed that figure, when initially treating styrene. A range from about 100° C. to about 146° C. is effective for most modifications of styrene.

It is to be understood, however, that various physical properties and characteristics of styrene may be modified during the course of treatment, including the boiling or decomposition point itself, and in view of this in instances where the boiling point is increased by virtue of the process, subsequent continued treatment, or treatment of the styrene in successive stages may be accomplished at temperatures higher than 146° C. Thus, as will appear in examples given herebelow, in the latter stages of multi-stage treatment of styrene, the treatment temperature was carried up to as high as 200° C., and even somewhat higher temperatures may be employed, depending upon the condition of the material at the time. This may be of importance, for instance, where the material is being treated with polar compounds tending to retard solidification of the product.

As an additional point in connection with temperatures, it may be noted that the treatment is applicable where the styrene is being modified in the presence of other materials. In this event the mixture may have a higher boiling point than that of styrene, because of the presence of other materials, and the temperature may under such circumstances also be above the boiling point of the styrene itself.

Another point to be kept in mind in connection with temperature is that variations in temperatures may be desirable in accordance with whether or not the styrene is being treated in the presence or in the absence of solvents. Where solvents are employed, the temperature may be determined at least in part by the nature of the solvent itself. On the other hand, in the absence of solvents a temperature of at least 100° C. is usually desirable.

As a general guide it may be said that the temperature treatment should not exceed the decomposition point or boiling point of the reaction mixture, or of that major ingredient having the lowest boiling or decomposition point. Particularly advantageous results are frequently secured by employing a temperature close to the boiling or decomposition point.

The reaction may take place under refluxing and this may be useful for a number of purposes, including promotion of thorough dispersion of the modifying agent. In such refluxing process, a solvent may be used either for the modifying agent or for the styrene or for both.

The time of treatment may be varied over a very broad range, depending upon the nature of the modification desired and upon other conditions of the process, including the modifying agent being employed. As a general guide from about ½ hour up to about 10 or 15 hours is effective.

With regard to the percentage of modifying agent, here again considerable variation is possible, depending upon the results desired. Anywhere upon to about 10% of the modifying agent is usually found quite effective, for instance, from about a trace such as .05% or .5% up to about 10%. For many purposes from 1% or 2% up to 10% constitutes the most effective range.

The treatment may be carried out under varying conditions of pressure and atmosphere, for instance, under vacuum, at atmospheric pressure or at higher than atmospheric pressure. Other variations in this regard are mentioned more fully hereinafter.

EXAMPLES

In a series of comparative examples below, a number of treatment conditions were maintained the same in each case. For the purpose of conducting this series, a constant temperature glycerine bath was used for heating, the bath being thermostatically regulated to control the temperature of the bath to within 1°, plus or minus, of 122° C. In each example a charge of styrene was placed in an Erlenmeyer flask, with a thermometer in the charge and with a delivery tube attached to the flask. In each case the treatment period was 6 hours.

In the several different examples different modifying agents were used, the quantity of modifying agent being 5%.

In addition to the numbered examples discussed just below, blank experiments were also conducted in the same manner. One such blank experiment, identified as Blank A, utilized a 250 gram charge of styrene in a 500 ml. flask, this blank being made for purposes of comparison with other examples employing the same size flask and the same size charge. In treating Blank A, the temperature rose by exothermic reaction to 157° C. in 3 hours. The product of this blank (at room temperature) was a plastic gel.

In another such blank experiment, identified as Blank B, a 100° gram charge of styrene was placed in a 250 ml. flask. This blank may be compared with various of the numbered examples employing a 250 ml. flask and a 100 gram charge. In the treatment of Blank B, the material reached a temperature of 126° C. in 3 hours. The rise and decline in temperature was very gradual. The product of this blank was a somewhat elastic gelatinous product of rubber-like consistency at room temperature.

All statements made with regard to consistency of the products refer to consistency when cooled to room temperature.

*Example 1*

A 250 gram charge of styrene was placed in a 500 ml. flask. Sodium bisulphite was used as the modifying agent, the agent first being pulverized and then added to the charge. The temperature rose to 156° C. within 4 hours, the approach to that temperature being gradual although the subsequent drop was very sharp. The product was a vitreous solid showing no cold flow.

*Example 2*

A 250 gram charge of styrene was placed in a 500 ml. flask. Barium peroxide was pulverized and added to the styrene. In 3½ hours the reaction mass reached a temperature of 147° C., both the approach to and the recession from that temperature being gradual. The product was a rubber-like solid, stiffer and more tenacious than the corresponding Blank A.

*Example 3*

A 100 gram charge of styrene was placed in a 250 ml. flask, together with 5% of pulverized anhydrous sodium sulphate. The temperature rose to 124° C. within ½ hour, which temperature was maintained fairly uniformly for about 4 hours after which the temperature dropped. The product was similar to the corresponding control B but was harder and more in the nature of a rubber-like plastic.

Example 4

A 100 gram charge of styrene was placed in a 250 ml. flask with 5% of sodium bisulphate (sodium acid sulphate). A maximum temperature of 127° C. was reached within 3 hours, with gradual rise and decline. The product was harder and more rubber-like and elastic than the corresponding control B.

Example 5

100 gram charge styrene was placed in a 250 ml. flask together with 5% of benzidine base. The temperature rose within 30 minutes to 126° C. and showed a very gradual decline for the duration of the experiment. The product was a soft pasty mass of brown color, containing partially undissolved modifying agent.

Example 6

100 gram charge of styrene was placed in a 250 ml. flask with 5% salicylic acid. The temperature rose to 125° C. in about 3½ hours and showed a gradual decline thereafter. The product was a paste-like mass containing some undispersed modifying agent.

Example 7

100 gram charge of styrene was placed in a 250 ml. flask with 5% sodium bicarbonate. During the reaction bubbling and gas evolution occurred and the temperature did not deviate more than about 1° from 121° C. The product was a soft mass, the modifying agent apparently having been at least partially decomposed.

Example 8

100 grams of styrene were placed in a 250 ml. flask with 5% chloral hydrate. The temperature rose to 120° C. within one hour which was maintained to about the third hour of treatment, after which the temperature declined 3° below the temperature of the thermostatically controlled bath, (122° C.). The product was a viscous water-white liquid of uniform appearance.

Examples 3 to 8 inclusive above are comparative, all being performed with a 100 gram charge in a 250 ml. flask under the same conditions of heating, time, etc. Comparison of the products of this group of examples indicates that the sodium sulphate and the sodium bisulphate of Examples 3 and 4 both displayed solidifying action, whereas benzidine base, salicylic acid, and chloral hydrate of Examples 5, 6 and 8, all displayed a "liquefying" action, this action being very strong in the case of chloral hydrate.

Example 9

A 100 gram charge of styrene was placed in a 250 ml. flask, together with 5% of p-toluene sulphonic acid. A maximum temperature of 143° C. was reached within 20 minutes with rapid drop to 117° C., which temperature was maintained throughout the balance of the treatment. The product was a soft brown paste having an opalescence and green fluorescence.

Example 10

A 100 gram charge of styrene was placed in a 250 ml. flask together with 5% of diphenylamine. The maximum temperature reached was 120° C., this being attained in about 3½ hours. The increase to this temperature and the drop which followed were both rapid. The average temperature of the treatment was noticeably below that of the heating bath. The product was of a uniform brown color and was a slightly gelatinous paste, somewhat softer than the corresponding control B.

Example 11

A 100 gram charge of styrene was placed in a 250 ml. flask together with 5% of anhydrous calcium chloride. The temperature rose rapidly (within 20 minutes) to 123° C. and thereafter varied somewhat between about 118° C. to 121° C. for the duration of the treatment. The product was an elastic rubber-like mass of harder consistency than the corresponding control B.

Calcium chloride, Example 11, had a solidifying action, whereas p-toluene sulphonic acid and diphenylamine both displayed a "liquefying" action.

Example 12

A 100 gram charge of styrene was placed in a 250 ml. flask together with 5% of trichloracetic acid. The temperature averaged about 118° C. throughout the treatment. The product was a slightly viscous liquid.

Example 13

A 100 gram charge of styrene was placed in a 250 ml. flask together with 5% of p-nitrophenol. Two peak points appeared in the temperature curve during heating, each at about 124° C., one occurring at 1½ hours and the other at 5 hours. The product was a limpid liquid from which a portion of the modifying agent crystallized out.

Example 14

A 100 gram charge of styrene was placed in a 250 ml. flask with 5% of sodium hydroxide pellets. Maximum temperature, of 128°, was noted at 2½ hours. The approach to the maximum was gradual and the maximum persisted for a period of about 1½ hours, with very gradual drop to 124° toward the end of the treatment. The product was harder and tougher than the corresponding control B.

It will be noted that the trichloracetic acid and p-nitrophenol of Examples 12 and 13 both displayed liquefying action, the latter being more pronounced than the former.

Example 15

A 100 gram charge of styrene was placed in a 250 ml. flask and heated in a glycerine bath maintained at 120° C. to 126° C., the heating being continued for 5½ hours. During the heating $SO_2$ was slowly bubbled through the batch.

A similar blank experiment was conducted under exactly the same conditions, but without the $SO_2$.

Upon cooling to room temperature, it was found that the $SO_2$ treated product was noticeably harder than the blank, and had a yellowish color.

Example 16

30 grams of styrene were placed in a glass beaker with 20 grams of maleic anhydride. The beaker was heated in a water bath maintained at a boil.

A vigorous reaction ensued, with a rapid rise in temperature to 160° C. The product became quite solid, resembling a shellac-like resinous material, which strongly adhered to the walls of the beaker.

*Comparative series of Examples 17a–e*

In this series the products of the Blank B and of Examples 8, 9, 11 and 12 above were all subjected to further heating by immersing the original reaction vessels, unstoppered, in an oil bath maintained at a temperature of from 145° C. to 155° C., for 3 hours. The products were examined in both the hot and cold state (cooled to room temperature) and the results are indicated in the following table:

| Ex. No. | Prod. of Ex. No. | Agent | Consistency at reaction temperature | Consistency at room temperature | Color |
|---|---|---|---|---|---|
| 17a | B | Blank | Gel | Vitreous solid | Water-white. |
| 17b | 8 | Chloral hydrate | Viscous liquid | Hard tough solid | Do. |
| 17c | 9 | p-Toluene-sulphonic acid | Thin liquid | Slightly gelled paste | Brown. |
| 17d | 10 | Diphenylamine | Very viscous liquid | Hard tough solid | Do. |
| 17e | 12 | Trichloroacetic acid | do | Very hard tough solid. | Yellow. |

The product of Example 17b, when hot, can be drawn into a very long thread.

The product of Example 17c was very sticky when cool.

*Comparative series of Examples 18a–e*

The products from Examples 17a–e were then placed in an oven at 190° C. to 200° C., for 3 hours. On cooling, the products were as follows:

| Ex. No. | Corres. No. of 17 series | Characteristics when cooled |
|---|---|---|
| 18a | 17a | Friable near-white solid. |
| 18b | 17b | Yellow solid, brittle and friable but less so than the blank. |
| 18c | 17c | Dark-colored plastic, pliable mass. |
| 18d | 17d | Light yellow solid of more pronounced toughness than 17a, 17b, 17c and 17e. |
| 18e | 17e | Reddish solid, brittle but slightly tougher than product 18b. |

It may be noted that the example above containing p-toluene-sulphonic acid (18c) plainly showed that the modifying agent exerted a pronounced "liquefying" action. The product containing diphenylamine (18d) had increased toughness. The other modifying agents varied other properties of the material.

VARIABLES AND SUPPLEMENTAL TREATMENT

One point to be kept in mind under this heading is that, as before mentioned, the styrene may be treated not only by itself but also in combination with other materials, especially with organic isocolloids, for instance, with fatty oils, fatty and resin acids, etc. In addition, it is here pointed out that the treatment is applicable not only to styrene itself but also to substituted styrene or styrene homologs, which behave in the same manner or in a similar manner to styrene.

The modifying agents may be used in combination or may be produced in situ in the reaction mixture.

In addition to treatment at various different pressures as above noted, the process of modification may also be carried out in the presence of air or in the absence of air, or in the presence of certain other gases, such for instance, as $CO_2$ and nitrogen. Such gases may be either bubbled through the reaction mass or may be employed as a blanket upon the surface of the reaction mixture.

Light treatment and wave treatment of various types also influence the reaction, for instance, treatment with visible light, ultra violet light or with electrical potential differences. Irradiation with oscillating energy of various wave lengths, X-rays, etc., may also be used.

Useful products may be made by emulsification of the modified styrene, or if desired, the modification process itself may be carried out on styrene emulsions.

Many variations in process are possible, but these need not be considered in detail herein, since this subject is more fully considered in my copending application 318,650 above mentioned, to which reference may be had if desired. In addition, a number of variables and supplemental treatments, and also certain other features herein disclosed, are also disclosed in my earlier applications Serial Nos. 359,425, (now Patent 2,213,944); 359,424 (now Patent 2,007,958); 446,172 (now Patent 2,213,943); 273,159 (now Patent 1,985,230); and 143,786 (now Patent 2,189,772).

I claim:

1. In the treatment of styrene to modify the properties thereof, the process which comprises incorporation in the styrene from 0.5% to 10% of an inorganic salt, which is a member of the class consisting of sodium bisulfite, sodium sulfate and sodium bisulfate, to promote the solidification of the styrene which would tend to take place under the treatment conditions applied, and heating the mixture above 100° C. but not above the point at which appreciable distillation or decomposition, whichever is lower, takes place under the conditions of the treatment, the heating being continued until the material produced is appreciably harder than the same material heated to the same temperature and under the same conditions but without a modifying agent.

2. The process in accordance with claim 1 in which the inorganic salt is in a substantially dry state, when incorporated into the styrene.

3. In effecting substantial changes in the physical consistency of styrene, the process which includes the application of heat to an intimate admixture of monomeric styrene with at least 1% but not more than about 10% of a modifying agent, said agent being a metal salt of a sulfur-containing inorganic acid, and being a member of the class consisting of sodium bisulfite, sodium sulfate and sodium bisulfate, in which process the mixture is maintained at the temperature above 100° C. but not above the distillation point of the reaction mixture for at least a half hour, and until a product results which manifests a physical consistency of increased hardness, when compared with that produced upon subjecting monomeric styrene to the same treatment but in the absence of a modifying agent.

4. The process of claim 3 in which the percentage of the modifying agent used is 5%.

5. The process of claim 3 in which 5% sodium bisulfite was used as the modifying agent, the agent first being pulverized and then added to the styrene, yielding a product which was a vitreous solid showing no cold flow.

6. The process of claim 3 in which 5% pulverized anhydrous sodium sulfate was used as a modifying agent, yielding a rubber-like hard plastic product.

7. The process of claim 3 in which 5% sodium bisulfate was used as the modifying agent, yielding a product which was hard, rubber-like and elastic.

LÀSZLÓ AŪER.